(12) United States Patent
Miller et al.

(10) Patent No.: US 8,709,524 B2
(45) Date of Patent: Apr. 29, 2014

(54) PROCESS FOR PREPARING RED COCOA INGREDIENTS, RED CHOCOLATE, AND FOOD PRODUCTS

(75) Inventors: Kenneth B. Miller, Palmyra, PA (US); Xiaoying Wang, Hummelstown, PA (US); David A. Stuart, Hershey, PA (US); Mark Holmgren, Hummelstown, PA (US)

(73) Assignee: The Hersey Company, Hershey, PA (US)

( * ) Notice: Subject to any disclaimer, the term of this patent is extended or adjusted under 35 U.S.C. 154(b) by 494 days.

(21) Appl. No.: 12/274,080

(22) Filed: Nov. 19, 2008

(65) Prior Publication Data

US 2009/0130284 A1   May 21, 2009

Related U.S. Application Data

(60) Provisional application No. 60/996,468, filed on Nov. 19, 2007.

(51) Int. Cl.
*A23G 1/00* (2006.01)

(52) U.S. Cl.
USPC ......................................................... 426/631

(58) Field of Classification Search
USPC ......................................................... 426/631
See application file for complete search history.

(56) References Cited

U.S. PATENT DOCUMENTS

| | | | |
|---|---|---|---|
| 2,957,769 A | 10/1960 | Rusoff | |
| 4,784,866 A * | 11/1988 | Wissgott | 426/262 |
| 5,009,917 A * | 4/1991 | Wiant et al. | 426/631 |
| 5,114,730 A * | 5/1992 | Ellis | 426/593 |
| 5,395,635 A | 3/1995 | Yanamoto et al. | |
| 5,888,562 A | 3/1999 | Hansen et al. | |
| 6,015,913 A * | 1/2000 | Kealey et al. | 549/386 |
| 2001/0007693 A1 | 7/2001 | Myers et al. | |
| 2005/0244544 A1 | 11/2005 | Lloyd et al. | |
| 2008/0107783 A1* | 5/2008 | Anijs et al. | 426/270 |
| 2012/0035252 A1* | 2/2012 | Steffan et al. | 514/456 |

FOREIGN PATENT DOCUMENTS

| | | |
|---|---|---|
| GB | 751121 | 2/1954 |
| GB | 0801119.9 | 1/2008 |
| RU | 646254 | 8/1997 |
| WO | 00/22935 | 4/2000 |

(Continued)

OTHER PUBLICATIONS

Swain, T., "The Polyphenolic Compounds of Cacao" The British Food Manufacturing Industries Research Association, Scientific and Technical Surveys, vol. 23, Jun. 1954.

(Continued)

*Primary Examiner* — Carolyn Paden
(74) *Attorney, Agent, or Firm* — Wiley Rein LLP

(57) ABSTRACT

The invention provides acidified red cocoa products and ingredients, such as acidified red cocoa bean nibs, red cocoa liquor, and red cocoa powder. The acidified cocoa products and ingredients are generally made from under-fermented or unfermented cocoa beans that are treated with an acid composition. The methods include those of making food products and ingredients where the levels cocoa antioxidants are maintained by the use of an acid treatment and the avoidance of dutching, and the food products and ingredient have a distinctive red color. Cocoa nibs, chocolate or cocoa liquor and cocoa powders having a red hue or color and having high levels of cocoa antioxidants are disclosed, as well as food products made from them.

34 Claims, 5 Drawing Sheets

(56) References Cited

FOREIGN PATENT DOCUMENTS

| WO | 0193690 A2 | 12/2001 |
|---|---|---|
| WO | 02/063974 A1 | 8/2002 |
| WO | 2009093030 A1 | 11/2008 |

OTHER PUBLICATIONS

Brouillard, Raymond, Anthocyanins as Food Colors, "In Chemical Structure of (Anthocyanins)", Academic Press 1982 pp. 1-23.
Stintzing, Florian C., et al., "Color and Antioxidant Properties of Cyanidin-Based Anthocyanin Pigments", Journal of Agriculture Food Chem. 2002, vol. 50, pp. 6172-6181.
Pettipher, Graham L., "An Improved Method for the Extraction and Quantitation of Anthocyanins in Cocoa Beans and its Use as an Index of the Degree of Fermentation", J. Sci. Food. Agric. 37: pp. 289-296, 1986.
Shamsuddin, S.B., et al., "Qualitative and Quantitative Measurements of Cacao Bean Fermentation", In "Cacao Biotechnology". 1986, pp. 55-78.
Minifie, Bernard W., Ph.D., 3rd ed. "Chocolate, Cocoa, and Confectionery—Cocoa Processes", 1989, pp. 60-67.
Miller, Kenneth B., et al., "Impact of Alkalization on the Antioxidant and Flavanol Content of Commercial Cocoa Powders", Journal of Agriculture and Food Chemistry, 2008, vol. 56, No. 18, pp. 8527-8533.
21 CFR Ch. 1 (Apr. 1, 2006 Edition) Food and Drug Administration, HHS 163. (sections 163.5 to 163.112).
Singleton, Vernon, et al., "Anthocyanin-Tannin Interactions Explaining Differences in Polymeric Phenols Between White and Red Wines", American Journal Enology and Viticulture, vol. 43, No. 1, 1992, pp. 63-70.

Supplementary European Search Report issued in EP 08853094.4 dated Nov. 2, 2010.
Adamson et al. "HPLC Method for the Quantification of Procyanidins in Cocoa and Chocolate Samples and Correlation to Total Antioxidant Capacity" J. Agric. Food Chem. 1999, vol. 47, pp. 4184-4188.
International Search Report and Written Opinion of the International Searching Authority for PCT/US08/84059 dated Feb. 5, 2009.
Hansen, Carl E., et al., Enzyme Activities in Cocoa Beans During Fermentation, J Sci Food Agric 1998, vol. 77, pp. 273-281, Printed in Great Britain.
Kim, H. et al., (−)-Epicatechin Content in Fermented and Unfermented Cocoa Beans, Journal of Food Science, 1984, vol. 49, pp. 1090-1092.
Thompson, Sterling S., et al., Cocoa and Coffee, Food Microbiology: Fundamentals and Frontiers, 3rd Ed., 2007 ASM Press, pp. 837-850.
Villeneuve, F. et al., Recherche D'un Indice De Fermentation Du Cacao, III. Evolution des flavan-3-ols de la feve, Cafe Cacao The, vol. XXXIII, n. 3, Jul.-Sep. 1989, pp. 165-170.
S.T. Beckett, Industrial Chocolate Manufacture and Use, 1988, p. 23, Van Nostrand Reinhold Company, New York.
Bernard W. Minifie, Chocolate, Cocoa, and Confectionery: Science and Technology, Third Edition, 1989, pp. 25-26, Chapman & Hall, New York.
T.Stark et al, Sensory-Guided Decomposition of Roasted Cocoa Nibs (*Theobroma cacao*) and Structure Determination of Taste-Active Polyphenols, Journal of Agriculture and Food Chemistry, 2005, vol. 53, pp. 5407-5418.
N. Camu et al., Fermentation of Cocoa Beans: Influence of Microbial Activities and Polyphenol Concentrations on the Flavour of Chocolate, Journal of the Science of Food and Agriculture, 2008, vol. 88, pp. 2288-2297.

\* cited by examiner

| Cocoa Bean | Fermentation Index | Cyanidin-3 galactoside (ug/g) | Cyanidin-3 arabinoside (ug/g) | Total Cyanidins (ug/g) | Macbeth color scale of Liquors from Acidified Beans | | | | Visual Color |
|---|---|---|---|---|---|---|---|---|---|
| | | | | | L | a | b | a/b | |
| Brazil, raw, Unfermented | 0.400 | 628.10 | 858.30 | 1486.40 | 15.41 | 25.45 | 4.15 | 6.13 | Red |
| Dom. Rep. Lavado Unfermented | 0.420 | 257.80 | 405.10 | 662.90 | 15.90 | 18.34 | 9.17 | 2.00 | Red |
| Mexican Lavado Organic Unfermented | 0.420 | 270.20 | 385.70 | 655.90 | 16.76 | 19.20 | 6.44 | 2.98 | Red |
| Mexican Lavado CL2 Unfermented | 0.461 | 215.50 | 364.30 | 579.80 | 13.39 | 17.41 | 8.67 | 2.01 | Red |
| Mexican Lavado CL3 Unfermented | 0.541 | 68.80 | 148.70 | 217.50 | 15.34 | 18.11 | 6.70 | 2.70 | Red |
| Ecuador-Arriba | 0.615 | 69.70 | 125.90 | 195.60 | 14.21 | 15.81 | 12.12 | 1.30 | No Red |
| Sulawesi | 0.731 | 47.20 | 66.50 | 113.70 | 15.14 | 15.52 | 15.02 | 1.03 | No Red |
| Nigeria | 0.820 | 44.80 | 72.30 | 117.10 | n/a | n/a | n/a | n/a | n/a |
| Ivory Coast | 0.960 | 7.70 | 16.60 | 24.30 | n/a | n/a | n/a | n/a | n/a |
| Papua New Guinea | 1.380 | 0.01 | 0.01 | 0.02 | n/a | n/a | n/a | n/a | n/a |
| Jamaica | 1.440 | 0.01 | 0.01 | 0.02 | n/a | n/a | n/a | n/a | n/a |

PROCESS FOR PREPARING RED COCOA INGREDIENTS, RED CHOCOLATE, AND FOOD PRODUCTS

REFERENCE TO RELATED APPLICATIONS

This application claims priority benefit to U.S. provisional application 60/996,468, filed Nov. 19, 2007, the entire contents of which is specifically incorporated herein by reference.

FIELD OF THE INVENTION

The invention relates to an acidification process using unfermented or under-fermented cocoa beans or nibs and food products that contain the acidified cocoa ingredients made from the process. In particular, the process does not involve extraction, which is a commonly used step in producing food ingredients from unfermented cocoa beans. Advantageously, the resulting cocoa ingredients and food products have a red color consistent with or even superior to alkalized cocoa powders or products known in the art, but the process of the invention avoids the alkalization or dutching step. Accordingly, the process of the invention results in red/purple colored cocoa ingredients with a unique, pleasant flavor profile and high levels of beneficial cocoa compounds, such as flavanols, flavanoids, resveratrols, polyphenols, and other antioxidants.

RELEVANCE OF THE INVENTION AND DESCRIPTION OF RELATED ART

Various methods exist for processing cocoa material, such as beans, into chocolate liquor, cocoa mass, cocoa powder, or other commodity. In general, chocolate manufacturers use both fermented and roasted beans as the taste profile improves with these traditional steps. But there has been historical commercial use of under-fermented cocoa beans, such as Sanchez beans from Dominican Republic, Sulawesi beans from Indonesia, and Cacao Lavado from Mexico. The taste characteristics of unfermented or under-fermented and unroasted bean products are typically extremely bitter and unpalatable in all but small and diluted quantities. However, it is well known in the art that unfermented beans are higher in epicatechin and polymerized flavan-3-ols. Hence, there is a desire to incorporate these products into foods because of their high antioxidant levels. Accordingly, in one aspect, the methods, food ingredients, and products, of the invention address this problem by providing cocoa ingredients that can be used in high levels in food products and are based on unfermented or under-fermented cocoa beans treated with an acid or low pH composition, especially edible low pH compositions or those used in the food or beverage industry. The food ingredients and product, therefore, contain high levels of cocoa antioxidants and other beneficial cocoa compounds.

In another aspect, the methods, food ingredients and products of this invention provide a new and novel way of making red cocoa products by acid treating unfermented or under-fermented cocoa bean material in a single step, and/or without extraction, to yield a very distinctive red/burgundy color and acceptable product flavor while still maintaining high antioxidant content. A further advantage of the invention is the novel use of a neutralizing agent in the final product to reduce sourness and improve the flavor profile of the products made from the invention.

BRIEF SUMMARY OF THE INVENTION

As noted above, the invention, in one aspect, satisfies a need for beneficial cocoa ingredients containing high antioxidant levels and capable of being used in a wide variety of food or consumable products at levels commonly associated with a cocoa liquor or powder rather than an additive. For example, the acidified or red cocoa powder, cocoa liquor, or cocoa solids produced from the methods of the invention can be used directly as the cocoa ingredient in a chocolate bar with or without other cocoa components. In these examples, the cocoa products and ingredients have the added advantage of having a red color or hue compared to untreated natural cocoa products. A further advantage is the distinctive taste profile that results from the cocoa products made from the methods of the invention. And yet a further advantage is the lack of an alkalizing step to produce the red color, as alkalizing is known to reduce the levels of epicatechin and other beneficial cocoa compounds (Miller, K. B., J. Ag. Fd. Chem. 2008, 56:8527). In combination with other known antioxidant compounds found in foods or cocoa, the new cocoa products, chocolates, and food ingredients and products advantageously provided by the invention create new possibilities for producing or supplementing foods with beneficial levels of natural cocoa compounds, such as flavanols, flavanoids, resveratrols, polyphenols, and other antioxidants. Furthermore, the advantageous use and effect of the acidification process, using food grade acids (e.g. citric, ascorbic, phosphoric, acetic, fumaric) and/or low pH food-derived compositions (e.g., lemon juice concentrate) and/or other low pH compositions (e.g., glucono-delta-lactone, sodium acid sulfate) on the color and/or flavor of the cocoa product would not have been expected given the prevalence of alkalization steps in cocoa processing.

The invention relates to methods of treating and/or processing raw or fresh cacao seeds, commonly referred to as beans, and parts thereof to make cocoa ingredients or products having improved properties or characteristics. In particular, the invention relates to methods of producing cocoa ingredients or products while preserving or maintaining high levels of natural antioxidants, and/or where a red color or hue results. Color measuring methods are known in the art, and Hunter color score a/b ratios of about 2.0 or higher are preferred, and ranges from about 2 to about 6, and 3 to about 5 or 6 are more preferred. Alternatively or in addition, the Hunter or the Macbeth color "a" values for red cocoa ingredients of the invention, like cocoa powder and cocoa liquor, can be in the range of about 16 to about 25, and/or the color "b" values for the red cocoa ingredients can be in the range of about 4 to about 7. Therefore, on at least a theoretical basis, red cocoa powder and cocoa liquor of the invention can have a Hunter or Macbeth score a/b ratio as high as 12, and typically is above 2. Accordingly, the red hue of the cocoa products of the invention can be defined using any one or more of the "a" or "b" or "a/b" values or ranges discussed here or reported in the examples below or elsewhere in this disclosure. In one embodiment the invention comprises the use of an acid solution to produce red cocoa ingredients from unfermented or under-fermented cocoa beans or nibs. Substantially unfermented cocoa beans or nibs are treated with an acid composition followed by washing and/or solvent removal from the treated nibs and processing the nibs into a cocoa ingredient for use in a food ingredient or product. The cocoa ingredient formed has a red color or hue and is capable of being used at 0.1-1% by weight, but preferably 1% or more by weight, in a food product so that the food product exhibits a distinctive red color, acceptable flavor and/or a desired amount of antioxidant or beneficial cocoa compounds.

In more particular embodiments, the methods of the invention involve the use of an acid composition at about pH 4 or below, or between about pH 1 and about pH 3. In other particular embodiments the acid composition can comprise one or more of the following: phosphoric acid; citric acid; adipic acid; lactic acid; ascorbic acid; malic acid, tartaric acid; fumaric acid; acid compositions derived from fruit juices or extracts or concentrates; sodium acid phosphate; sodium acid sulfate, gluconic acid; and glucono-delta-lactone. Acetic acid, as a volatile compound, tends to evaporate and is not a preferred food grade acid. The acid or low pH food composition can also include or additionally include a food grade alcohol, such as ethanol.

In general, the methods of the invention can be used to produce a cocoa ingredient, which may be a chocolate liquor, a cocoa powder, or other cocoa-derived product known, used, or available. One of skill in the art is familiar with many uses of such cocoa ingredients, and no particular use is required here. However, typical uses for such products as cocoa mass or chocolate liquor and/or cocoa powder are in the production of a chocolate product, including but not limited to, a milk chocolate product, a dark chocolate product, a semisweet or bittersweet chocolate product, a chocolate-flavored product, a chocolate confectionery, a chocolate-flavored confectionery, a beverage, a chocolate beverage, a chocolate-flavored beverage, a dairy based product, a yogurt, a dietary supplement, a chocolate-coated product, chocolate coatings and icings, a low fat chocolate product, or a low-sugar chocolate product, or a no sugar added cocoa product. Advantageously, the cocoa and chocolate products can be made to have a red color or hue, which can be associated with distinctive or premium cocoa products. Additionally, the incorporation of red cocoa ingredients in any liquid or solid product that has an acidic base, such as a yogurt, enhances or imparts a characteristic red color to the food and has the added benefit of preserving high levels of cocoa epicatechin in the final food product.

In the methods of producing a red cocoa ingredient for use in preparing a food product or ingredient, the removal of, evaporation of, washing to remove, and/or vacuum treatment or drying of the cocoa composition after treatment with an acid composition can be performed in one or a multiple of ways. In general, this removal or washing step substantially reduces the acid after-taste of the final product or ingredient. However, it is acceptable to have a slight acid after-taste, which can promote a sour fruit or yogurt-like flavor in the final food product. Accordingly, the removal, drying, or washing to reduce the acid need not be a complete removal or result in elimination of all the titratable acidity present at any stage in the process. Further, additives can be used in a final food product to cover or mask some of the acidity or acid taste remaining, and many food-acceptable bases or buffering systems can be used, such as but not limited to calcium carbonate, potassium carbonate and sodium hydroxide. Preferably, the bases or buffering systems are added to a final product, near the final processing into a product, and/or at the point in processing where a low moisture level and/or a low water activity level is maintained, such as in a chocolate or chocolate liquor.

In another aspect, the invention provides a method of maintaining the level of cocoa antioxidants, or other beneficial cocoa compounds, in a red cocoa composition. As noted, many documents refer to producing red cocoa powder using an alkali treatment (see, for example, U.S. Pat. Nos. 5,114, 730 and 5,009,917). However, the alkali treatment is known to reduce the levels of cocoa flavanol antioxidants. By using first a cacao bean sample containing, for example, raw, unfermented beans, or any combination of unfermented, under-fermented, or fermented beans that yield a total cyanidin content of 200 µg/g or more, and then processing the sample with an acid treatment step, the invention allows one to begin with and maintain a high level of natural cocoa antioxidants in a cocoa product compared to conventional cocoa products. Additionally, the methods of the invention surprisingly lead to an increase in the levels of measurable epicatechin in cocoa products compared to conventional methods. Other conventional cocoa processing steps can be incorporated into the acid treatment and ethanol treatment methods of the invention, for example those for producing a cocoa liquor or reduced fat cocoa solids product such as cocoa powder. Furthermore, the processing of raw or fresh cocoa beans has been described and available sources of these beans from South America or elsewhere exist (see, for example, US 2004/0096566 and WO 2008/131910).

It is therefore an object of the invention to provide methods of processing unfermented or under-fermented cocoa beans, or products derived from raw or unfermented cocoa beans or cocoa nibs, with an acid treatment to produce red cocoa ingredients while maintaining high levels of beneficial natural cocoa compounds and antioxidant compounds. From a perspective of preserving the highest levels of cyanidins, it may be optimal to use a cocoa bean sample of nearly 100% raw, unroasted, unfermented beans. This sample, once processed, can be mixed with other or conventional cocoa products in making a food product. It is a further object of the invention to provide cocoa ingredients, including chocolate liquor, cocoa powder, low fat cocoa powder, and defatted cocoa powder maintaining high levels of beneficial natural cocoa antioxidant compounds, especially compared to conventional methods, as described in B. Minifie, Chocolate, Cocoa, and Confectionery, 3d Ed., Aspen Publishers. In particular, the invention includes methods of maintaining the high levels of any naturally occurring antioxidant compounds in cacao beans or products made from beans, including compounds having beneficial health effects, such as flavanols, flavanoids, resveratrols, polyphenols, epicatechin, and other antioxidants.

The beans, nibs, or bean derived products can optionally be roasted. However, treatments of cocoa beans or cocoa nibs with alkali or "dutching," as known in the art, are specifically avoided in the methods of the invention. Small amounts or varying amounts of separately produced or available dutched, natural, or raw cocoa powder or cocoa products can, however, be added in the preparation of any food product embodiment of the invention.

Numerous food or beverage products can be made from the cocoa compositions or ingredients of the invention, including but not limited to a chocolate product, a milk chocolate product, a dark chocolate product, a semisweet or bittersweet chocolate product, a chocolate-flavored product, a chocolate confectionery, a chocolate-flavored confectionery, a beverage, a chocolate beverage, a chocolate-flavored beverage, a dairy based product, a yogurt, a dietary supplement, a chocolate-coated product, a low fat chocolate product, or a low-sugar chocolate product.

Throughout this disclosure, applicants refer to journal articles, patent documents, published references, web pages, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention.

BRIEF DESCRIPTION OF THE DRAWINGS

Preferred aspects, objects, and embodiments of the invention are schematically represented in the exemplary drawings and flow charts, which in no way should be taken as a limitation on the scope or extent of the invention.

FIG. 6 is a Table showing the cyanidin content of various cocoa bean samples and the color characteristics of the acidified cocoa liquors made from them. Fermentation index, certain cyanidin levels, Macbeth color characteristics, and visual color of several samples of unroasted beans from sources around the world are shown.

DETAILED DESCRIPTION OF EXEMPLARY EMBODIMENTS

Figure 1:
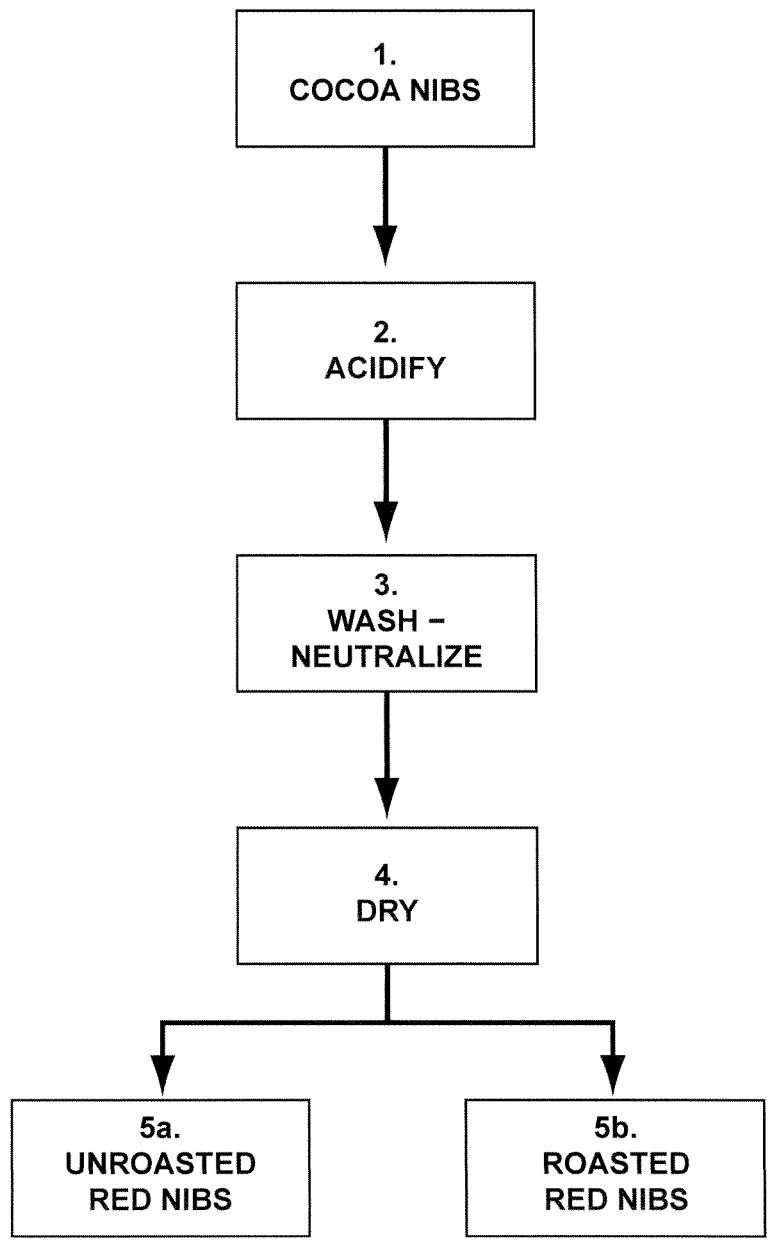
FIG. 1 shows exemplary processing steps for methods of producing an acidified red cocoa product, in this case the unfermented or under-fermented cocoa nibs are acidified, washed, and dried. The acidified cocoa nibs can then be used to produce a variety of cocoa products or ingredients as known or available in the art.

In one aspect the invention involves an acidification process of unfermented or under-fermented cacao beans or nibs from any source using any food grade acids, combination of acids, or other low pH food composite, as well as the products made from the acidified beans or nibs or derived from them. Specific samples of unfermented or under-fermented cacao beans are available from Mexico as "Cacao Lavado", Ecuador, Dominican Republic as "Sanchez", Brazil, and Sulawesi, and bean samples including these one or more available beans are preferred for the invention. Any unfermented cocoa bean sample prepared or processed in a manner to minimize fermentation would be expected to produce the characteristic red color described here. The acids used to treat the cacao nibs or cocoa products can be chosen from but not limited to an aqueous solution or alcohol/water solution of phosphoric acid, citric acid, acetic acid, sodium acid sulfate, gluconic acid, glucono-delta-lactone, and fruit juices or juice concentrates, such as lemon juice concentrate. While the use of strong acids with a fermented cocoa bean or cocoa nib has been referred to in the past, the strong off-flavors resulting rendered these cocoa products incompatible with food production (see British patent specification #751,121, published Jun. 27, 1956). Furthermore, acid treating water-extracted cocoa material from fermented beans yielded materials not suitable for food use alone (see U.S. Pat. No. 2,957,769). Similarly, numerous attempts have been made to produce cocoa and chocolate products with acceptable flavor and a red color. Some of these include the use of alkalized red cocoa liquors and powders, which can only produce marginally reddish brown colored products and have very low antioxidant content due to the impact of alkalization. One example (see British patent 5570/54 and U.S. Pat. No. 2,957,769) mentions that an acid treatment of cocoa material yields unacceptable flavors and is not a suitable option for producing red cocoa products. The same authors describe a multi-step process for extracting "fermented beans" followed by roasting the dried, water soluble components and acid treating the remaining cocoa material. The two fractions are then combined to yield a red colored cocoa mass from fermented beans.

This invention, on the other hand, involves the novel use of cacao beans or nibs or cocoa products derived form the beans or nibs and an acidification step to produce a red cocoa ingredient for use in foods and food ingredients. Preferably, the beans are unfermented or under-fermented.

The terms "cocoa bean composition," and "cacao bean composition" can be any of a variety of products and combinations of the cacao bean derived products noted in this disclosure, including the cocoa nibs themselves. "Cocoa bean composition," "cacao bean composition" and "cocoa products" are essentially interchangeable and mean a product made from a cacao bean, with the exception of cocoa butter, which is not included. A "cacao bean sample" or a "cocoa bean sample" is a collection of cacao beans or the nibs of such beans from a desired set or set of processing conditions. The terms unfermented and under-fermented cocoa bean refers to the degree of fermentation of cocoa beans as known by one skilled in the art. This degree of fermentation can be measured as fermentation index by the method of Gourieva and Tserevitinov (see Shamsuddin and Dimick, Qualitative and Quantitative Measurements of Cacao Bean Fermentation, in "Proceedings of the Cacao Biotechnology Symposium", Ed. P. S. Dimick, pages 55-74, The Pennsylvania State University, 1986) where unfermented beans are <0.5 and under-fermented beans are <0.7, and fermented beans are about 1.0 or above 0.8 on the fermentation index. Another way to estimate the degree of fermentation is to measure the cyanidin content of the raw beans (see, for example, Singleton and Trousdale, Anthocyanin-tannin interactions explaining differences in polymeric phenols between white and red wines, Am. J. Enol. Vitic. 1992, 43: 63-70). There are two major cyanidin compounds found in unfermented cocoa beans: cyanidin-3 galactoside and cyanidin-3 arabinoside, which together can be expressed as total cyanidins. The total cyanidin content decreases as fermentation progresses as shown in FIG. 6.

Other more traditional methods such as cut test can also be used. Furthermore, the under-fermented beans can be cacao beans that have undergone some degree of fermentation but can be processed into a cocoa derived product and treated with acid to produce a red cocoa product as described here. In addition, combinations of cocoa products involving cacao bean treated, processed, or selected under conventional methods can be combined with cacao bean compositions of the invention. These compositions can be used in any cocoa ingredient, which in turn can be used in any composition or product for human consumption, including foods, confections, beverages, and supplements.

Cocoa powder, as understood in the art, contains approximately 10-25% lipid fraction (cocoa butter) and it is typically retained in a natural cocoa powder product. However, all or a percentage of the fat can be removed from the powders by pressing, by solvent or supercritical solvent extraction, or any number of other methods, as known in the art. Thus, natural, defatted and/or low fat or non-fat cocoa powders are specifically included in the cocoa products or ingredients of the invention. Furthermore, the preferred red cocoa powders, cocoa bean compositions, and cocoa products of the invention can be roasted or treated with heating or roasting conditions at some point in the processing. As known in the art, cocoa nibs can themselves be used as ingredients in cocoa or chocolate food products, and thus, for example, crushed red cocoa nibs are a cocoa product or ingredient under the invention.

As one of skill in the art understands, a certain amount or percentage of cocoa solids in a food ingredient can be achieved, inter alia, by using or adding an amount of cocoa powder, chocolate liquor, or other chocolate or cocoa ingredient containing the requisite amount of cocoa solids. Similarly, a certain amount or percentage of natural cocoa in a food ingredient can be achieved, inter alia, by using or adding an amount of cocoa powder, chocolate liquor or other chocolate or cocoa ingredient. In addition, while a cocoa containing product having a particular antioxidant or polyphenol level is not required, the invention encompasses the use of or combination with cocoa containing products with enhanced, altered, or increased levels of antioxidants or polyphenol compounds as compared to conventional cocoa containing products. Other nutritional, therapeutic, or preventative ingredients can be added as well, as known in the art.

The cocoa compositions and products of the present invention contain high levels of flavanols, flavanoids, resveratrols, polyphenols, and other antioxidants. Thus, in another aspect or object, the present invention comprises cocoa ingredients processed by maintaining, and thus containing, high levels of one or more beneficial cocoa compounds as known in the art or particularly cocoa antioxidants, for example, chocolate liquor and cocoa powder. An added benefit of the invention is the increase in flavanol monomer content with acidification of unfermented cocoa nibs or liquor. Surprisingly, unfermented and unroasted bean samples treated with an acid method as described here result in an increase in the amount of epicatechin present. Since flavanol monomers have been associated with potential health benefits and epicatechin, in particular, may be the preferred bioavailable form, increased monomer content would be advantageous in cocoa based ingredients and chocolate products.

The term "cocoa ingredient" refers to any material containing cocoa solids that are derived from cocoa nibs. The term includes chocolate liquor, cocoa powder, defatted cocoa powder, low fat cocoa powder, and the cocoa nibs themselves. The terms "chocolate liquor" and "cocoa liquor" refer to the viscous substance formed by grinding cocoa nibs. Chocolate liquor is the key ingredient in the manufacture of many chocolate products, for example, milk chocolate, dark chocolate, semi-sweet baking chips, reduced fat chocolate, reduced-sugar or sugar-free chocolate, chocolate-flavored coatings, and baking chocolate.

In a preferred embodiment, a red cocoa powder in accordance with the present invention may have a total polyphenol content of about 80 mg/g to about 112 mg/g or more. A chocolate liquor according to the present invention may have a total polyphenol content of about 44 mg/g to about 63 mg/g or more. Alternatively, the ORAC levels of the acidified red cocoa ingredients of the invention may be about 650 micromole TE per gram of cocoa liquor, or about 1190 micromole TE per gram of cocoa powder, or higher.

The following steps can be selected for use in one or many of the examples possible.

Cacao Nibs selection for acid treatment—raw, unroasted, shell-free cocoa nibs; cocoa nibs from cocoa beans with high cyanidin content are preferred, and totally unfermented or Lavado (washed) beans are especially preferred (Mexico, Brazil, Guatemala, Dom. Rep). But under-fermented cocoa beans can also be used with a total cyanidin content >200 µg/g, or alternatively with a fermentation index of <0.7 and preferably <0.5, and more preferably <0.4. The under-fermented cocoa nib sample can be a blend, which includes at least about 10% or about 20% unfermented beans, such as Mexico Cacao Lavado beans to produce a blend having a cyanidin content >200 µg/g or a fermentation index of about 0.50 or below. One skilled in the art can select a cacao bean sample, or combination of beans of cocoa compositions, in order to arrive at a composition that yields an acidified red cocoa product or ingredient as described here by, for example, comparing the red hue of color with the color of a conventionally produced cocoa product on a color axis or color scale. Two visual color systems that can be used are the Pantone Color Formula Guide (Pantone Inc. 590 Commerce Blvd., Carlstadt, N.J. 07072) and the Munsell Book of Color (Macbeth Div. of Kollmorgan Corp., 2441 N. Calvert St., Baltimore, Md. 21218). The Hunter colorimeter, and scanning or computer-based reflectance, appearance or color scaling can also be used for a comparison of the red hue or color present in the acidified red cocoa products of the invention. Using a Macbeth or Hunter calorimeter, "L", "a", and "b" values are generated that can be used to compare the color characteristics of the products of the invention. A comparison of the Hunter "a"/"b" ratio has been used to determine the degree of red in cocoa powders with higher ratios being associated with more red color (U.S. Pat. No. 5,009,917). The Table shown in FIG. 6 illustrates the relationship between the degree of cocoa fermentation as measured by fermentation index and cyanidin content with visual and instrumental color determinations. Thus, many mixtures and percentages of unfermented and/or under-fermented cocoa nib or beans samples can be selected and used.

Acidification—Generally, the methods of the invention can involve one of several different acidification processes depending on whether the cocoa nib or other cocoa product derived from cocoa nibs is used. Various food grade acids and/or low pH food compositions can be applied in each process. For example, an acid washed cocoa nib process (FIG. 1) can include selecting an under-fermented (as in about a cyanidin content >200 µg/g or a 0.55 fermentation index or below) or unfermented cocoa nib sample and adding 1 part to 1.5 parts of a strong acid composition or solution. The acid can be one of many food acceptable acids, and the strength is about 0.10 N or above, preferably about 0.5 N to about 1 N, or above 1 N. For example, 1 N hydrochloric acid or 1 N phosphoric acid can be used, or about 3.8% (w/w) phosphoric or about 9.8% (w/w) hydrochloric acid. The acid treatment step can be from about 30 minutes to about 1-4 hours at room temperature, but other conditions can be selected, such as shorter time at higher temperatures as shown below, or lower concentrations at higher temperatures. It is possible to monitor the acidification step by visual inspection of the red/burgundy color that develops. The acidified cocoa nibs can exhibit a distinctive red color or hue.

In another acidification example (FIG. 2), a cocoa liquor from unfermented or under-fermented cocoa nibs can be treated with a minimum amount of acid; generally titratable acid equivalent of about 0.5% or above, for example about 1.0% to about 2% phosphoric acid in ethanol or water solution, having pH 4 or below or about pH 1 to about pH 3. The acid treatment step occurs for about 3-5 min. Other reaction conditions can also be selected, such as higher pressure and shorter time, as well as other ratios of acid solution to cocoa liquor. This yields red colored cocoa liquor. In another example, unfermented cocoa nibs or cocoa liquor with a fermentation index of <0.4 or a total cyanidin content of >1400 µg/g, such as Brazil raw cocoa beans, can be used where the amount of acid could be reduced to near zero (<0.1%), when 95% ethanol is used to treat the nibs or beans. Other bean blends or beans can be used in this treatment with ethanol.

Figure 2:
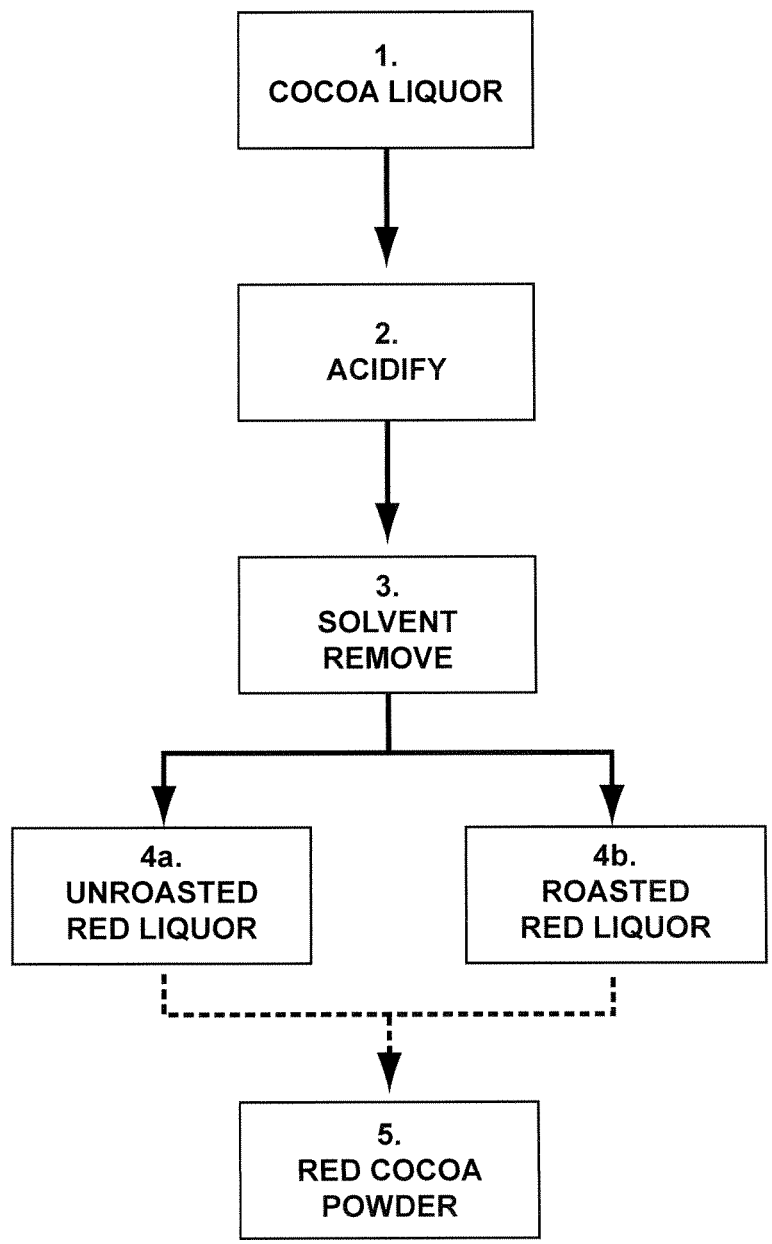
FIG. 2 depicts an exemplary process for producing an acidified red cocoa liquor and further acidified red cocoa powder that begins with the use of a cocoa liquor from unfermented or under-fermented beans. The cocoa liquor is treated with an acid solution followed by a solvent removal.

In another example of the invention, cocoa nibs and/or cocoa liquor that are treated with acid in the presence of ethanol as described previously (FIG. 2) yield a red colored cocoa product that is free of potentially harmful bacteria such as salmonella. The methods as shown in FIG. 1 and FIG. 2, with or without ethanol, can also be used to inactivate harmful bacteria or contaminants. According to the Microbiological Safety and Quality of Food-Vol. 1 (ed. B. Lund, T. Aaird-Parker, & G. Gould, Aspen Publishers, Gaithersburg, Md., 2000, ch. 35.5 Cocoa, Chocolate and Confectionery), chocolate and confectionery products do not normally support the growth of pathogens due to low water activities. However, Salmonella has been shown to survive under these low water activity conditions and, therefore, can pose a potential threat to the food if present. Roasting and alkalizing are the recognized treatments used to destroy Salmonella during processing. Since in some aspects the inventive process does not involve a traditional roasting step or an alkalization step, the red colored cocoa liquor and powder might be subject to Salmonella contamination. Advantageously, and in another embodiment of the invention, the inventive acidification process acts as a microbe inactivation step by effectively destroying harmful bacteria such as salmonella.

In a further example of acidification (FIG. 3), cocoa powder from under-fermented or unfermented cocoa nibs is treated with a desired amount of acid; generally titratable acid equivalent of about 1.8% (w/w) to about 3.6% (w/w) phosphoric acid in ethanol or water solution, with ratio of solutions to cocoa powder about 2 to 3. The acid treatment step occurs for about 3-5 min at 40° C. or above, and at least at a temperature sufficient to keep the cocoa liquor molten. Other reaction conditions can also be selected, such as higher pressure and shorter time, as well as other ratios of acid solution to cocoa powder. This yields a red colored cocoa mixture, and the development of a red color or hue can be monitored for any set of desired conditions.

Water washing and drying—After acidification, the red cocoa nibs are washed to remove excess amount of acids (FIG. 1). Preferably, this step leaves the cocoa nibs at a pH of above 3.0, or about pH 3.7 or above, preferably no higher than pH 5, while the acid treatment is usually at or between pH 1 and pH 3, or about pH 4 or below. Washing can be done with water or aqueous alcohol solutions, especially those involving food grade alcohols and ethanol.

The acid treated and washed cocoa nibs can then be dried using conventional drying methods, including low heat drying, evaporative drying, and/or vacuum drying. Preferably, a cocoa product with about 2% to about 5% moisture is preferred for further processing. The acidification, washing, and drying steps also provide a degree of sterilization to the cocoa product. Thus, the cocoa products can be used in final food products or ingredients without additional sterilization if appropriate conditions and acid treatment conditions are selected.

Solvent removal and drying—The red cocoa liquor from the acidification step (FIG. 2) is continuously mixed under vacuum at temperature of 50° C. or above, or at a temperature sufficient to keep the cocoa liquor molten, to remove solvents in the system. A red cocoa liquor with 2-5% moisture is desired, or in the case of ethanol, 0.5% or less ethanol in final food products is preferred for certain regulated food products, while others may have include a higher levels of ethanol or food grade alcohol if desired. Solvents in the acidified cocoa powder (FIG. 3) can be removed using conventional drying processes, for example low heat, evaporation, and/or vacuum treatments similar to that used for drying cocoa liquor. These acidification and solvent removal steps also provide microbial inactivation in the cocoa product. The cocoa products prepared can be used in final food products or ingredients without additional microbial inactivation steps.

Nib and Liquor Roasting—The acid treated red nibs or liquors can be roasted to develop roasted notes and enhance flavor while maintaining the red color. Traditional nib roasting can be applied to acid treated red nibs. However, a low degree of roasting is preferred to minimize color loss. In an example of liquor roasting, a vessel with a setting of 140° C., 300 rpm, 20 mm Hg vacuum can be used, as known in the art.

Pressing—A traditional cocoa powder process can be applied to yield a red cocoa powder from acidified cocoa nibs or cocoa liquor. The red cocoa powder can contain various amount of fat depending on its final application. Thus, the invention includes various defatted, low fat, or fat free cocoa products, including cocoa powders.

EXAMPLE 1

Acidification of Cocoa Nibs (FIG. 1)

600 g Lavado nibs is added to 900 mL of 1 N H3PO4 for 4 hours at 25° C. The acidified nibs are drained to remove access amount of acid solution, washed with 900 mL of deionized water for three times until the wash water is >pH 3.2, or about pH 3.5. The acidified and washed nibs are dried at 50° C. for about 10-20 hours. This yields red cocoa nibs with a moisture content of about 2%. In a separate roasting experiment, about 250 g of dried acidified cocoa nibs are roasted at 120° C. for about 15-20 min. The roasted cocoa nibs develop more flavor with a darker red color.

EXAMPLE 2

Acidification of Cocoa Liquor with Phosphoric Acid (FIG. 2)

Figure 4:
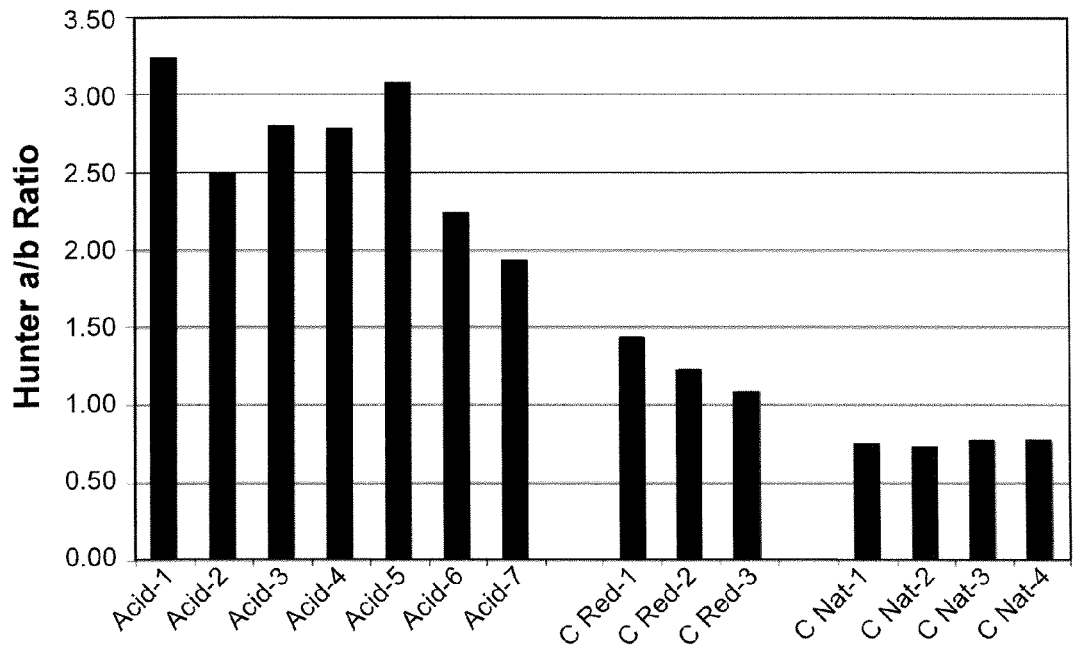
FIG. 4 is a chart depicting the Hunter color characteristics described in Table 1 for a series of cocoa powders made from: the red cocoa liquor of the invention (Acid-1 to Acid-7); commercial red alkalized cocoa powders (C Red 1-3); and commercial natural cocoa powders (C Nat 1-4). The degree of red color is expressed as the ratio of the Hunter a/b values. The higher the a/b ratio the more red color in the samples.

25 lbs of cocoa liquor from Cacao Lavado nibs are mixed with a solution of 3400 g of 5% H3PO4 ethanol solution (w/w) at 65° C. for 3 min. The mixture is continuously mixed for 20-30 min under vacuum of about 23 mmHg at about 65° C. A low viscosity red colored cocoa liquor is obtained with ethanol content of about 0.7%. In a separate sample, about 100 g of acid treated red liquor (as above) is pressed up to 13,000-15,000 psi for 30 min. This can yield a red cocoa powder with fat content around 12%. Shown below in Table 1 and in FIG. 4 is a comparison of commercial natural and red cocoa powders with red cocoa powders obtained by pressing red liquors obtained from the inventive process. Samples included: four commercial natural cocoa powders with a visual appearance of light to medium brown; three commercial red alkalized powders with a visual appearance of reddish-brown; and seven red cocoa powders from the acidified process of the invention with a bright red appearance. Color measurements of all samples were made with a Hunter Colorimeter obtaining separate L,a,b values. The "L" scale represents degree of lightness (100=light, 0=black), "a" represents the red/green scale (red=+100, green=−100), and "b" represents the yellow/blue scale (yellow=+100, blue=−100). The Hunter a/b ratio is one means of describing the amount of red color (U.S. Pat. No. 5,009,917) with higher a/b ratios representing more red color. The calculated a/b ratios for the samples show a clear advantage of the acidified red cocoa powders from inventive process compared to both the commercial alkalized red cocoa powders and natural untreated cocoa powders.

TABLE 1

Comparison of red colors of cocoa powders made from acidified, alkalized and natural cocoa materials.

| Source of Powder | pH | Hunter Color | | | a/b ratio* | Visual Color |
| --- | --- | --- | --- | --- | --- | --- |
| | | L | a | b | | |
| Acidified Lavado Liquor 1 | 3.96 | 28.6 | 21.5 | 6.67 | 3.22 | Bright Red |
| Acidified Lavado Liquor 2 | 5.03 | 33.0 | 16.2 | 6.53 | 2.48 | Bright Red |
| Acidified Lavado Liquor 3 | 4.51 | 36.7 | 20.1 | 7.19 | 2.80 | Bright Red |
| Acidified Lavado Liquor 4 | 4.37 | 31.1 | 17.8 | 6.42 | 2.77 | Bright Red |
| Acidified Lavado Liquor 5 | 4.07 | 28.2 | 21.0 | 6.85 | 3.07 | Bright Red |
| Acidified Lavado Powder | 4.79 | 42.4 | 16.3 | 7.29 | 2.24 | Bright Red |
| Acid/Washed Lavado Nibs | 3.59 | 30.9 | 18.4 | 9.51 | 1.93 | Bright Red |
| Commercial Red Powder 1 | 7.69 | 25.6 | 10.9 | 7.6 | 1.43 | Red/Brown |
| Commercial Red Powder 2 | 7.52 | 29.1 | 11.9 | 9.7 | 1.23 | Red/Brown |
| Commercial Red Powder 3 | 8.05 | 27.4 | 8.8 | 8.1 | 1.09 | Red/Brown |
| Natural Powder 1 | 5.39 | 40.3 | 10.8 | 14.5 | 0.74 | Light Brown |
| Natural Powder 2 | 5.53 | 40.8 | 10.1 | 14 | 0.72 | Light Brown |
| Natural Powder 3 | 5.60 | 38.8 | 9.7 | 12.7 | 0.76 | Light Brown |
| Natural Powder 4 | 5.76 | 38.1 | 9.9 | 12.9 | 0.77 | Light Brown |

The high "a" and "a/b" ratio values are associated with more red color (see U.S. Pat. No. 5,009,917). The acidified or acid/washed samples above are all produced according to the methods of the invention. The remaining samples are commercially available "red" alkalized cocoa powders and commercially available natural cocoa powders. The characteristic red color of the cocoa products of the invention can be a Hunter scale color score a/b ratio of about 2 or higher, or between about 2 and about 3. The pH of each of these compositions was also sampled by mixing in water.

To roast the acidified red cocoa liquor, about 500 g of red liquor is held in a roasting vessel at 120° C. for about 20 min. With mixing under a slight vacuum, a red colored roasted cocoa liquor can be obtained with detectable roasted notes.

EXAMPLE 3

Acidification of Cocoa Liquor with Lemon Juice Concentrate 20 lbs of cocoa liquor from cacao Lavado nibs are mixed with 4740 g of 9.5% (w/w) Lemon juice concentrate (50 brix) ethanol solution at 65° C. for 3 min. The mixture is continuously mixed for 20-30 min under vacuum of about 23 mm Hg at about 65° C. A low viscosity red colored cocoa liquor is obtained with an ethanol content of about 0.7%.

EXAMPLE 4

Acidification of Cocoa Liquor with Glucono-delta-Lactone 290 g of aqueous solution of 34% glucono-delta-lactone is prepared and allowed to stand for 2 hours at room temperature. The solution is mixed with 580 g of ethanol and added to 15 lbs of cocoa liquor from Cacao Lavado nibs. After mixing at 65° C. for 3 min, the mixture can be subjected to vacuum at about 23 mm Hg and continuously mixed at 65° C. for 20-30 min. A low viscosity red colored cocoa liquor can be obtained with an ethanol content of about 0.7%.

EXAMPLE 5

Figure 3:
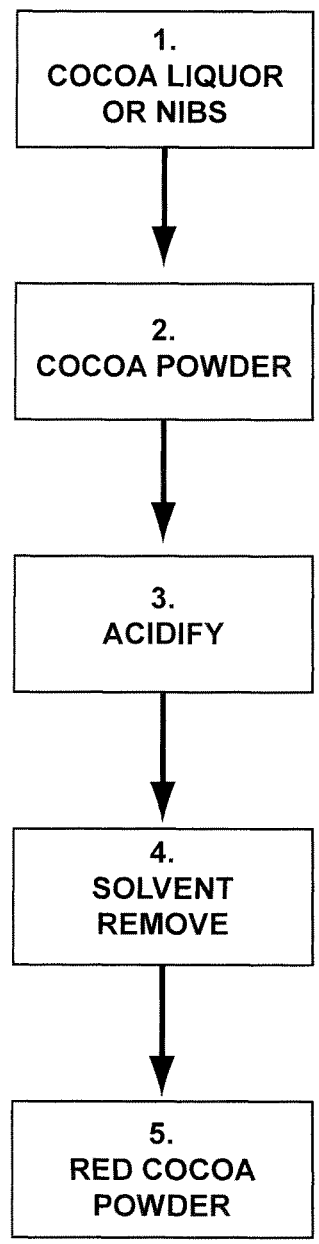
FIG. 3 depicts an exemplary method for producing an acidified red cocoa powder, where cocoa powder is produced from unfermented or under-fermented nibs or liquor and is then treated with an acid composition followed by drying.

Acidification of Cocoa Powder (FIG. 3)

30 g of cocoa powder is made from raw, unroasted Cacao Lavado nibs using a conventional pressing method. The cocoa powder is added to 39 g of 2.3% phosphoric acid/ethanol solution. The mixture is mixed at room temperature for 5 min, then dried in oven at about 50° C. for 6 hours. This can yield a red colored cocoa powder.

EXAMPLE 5a

Acid Induced Increase of Flavanol Monomers

Unfermented lavado cocoa nibs are ground into a mass and subjected to acidification according to the inventive process described in Example 2 (FIG. 2) using two types of acids (phosphoric or citric) in the presence of 95% ethanol. The resulting red cocoa liquor is analyzed for epicatechin, a flavanol monomer associated with potential health benefits. The results shown in Table 2 indicate that about a 20% or more increase in epicatechin levels can be obtained in the acidified red chocolate liquor compared to the untreated cocoa mass.

TABLE 2

Increased Epicatechin in Acidified Mexican Lavado vs. no acid treatment

| | Epicatechin Content (mg/g) | | |
|---|---|---|---|
| Trial | Non-Acid Treated (mg/g) | Acid Treated (mg/g) | % Increase |
| 1-phosphoric acid | 10 | 14 | 40.00% |
| 2-phosphoric acid | 11 | 12 | 9.10% |
| 3-citric acid | 10 | 12 | 20.00% |
| Avg | 10.3 | 12.7 | 23.00% |

A second comparison of the epicatechin content in acidified cocoa nibs from unfermented lavado beans with fermented Ivory Coast beans. The unfermented lavado cocoa mass acidified with phosphoric acid yielded a 9-26% increase in epicatechin compared to a zero to net decrease in epicatechin content in the acidified fermented Ivory Coast cocoa mass.

EXAMPLE 5b

Microbial Inactivation in Acidified Red Chocolate Liquor

The inventive acidification process in the presence of ethanol can be used to treat unfermented cocoa material that not only produces a red colored cocoa-based liquor and/or powder but also yields a food product that is free of potentially harmful bacteria such as salmonella. An example of this can be described by taking 100 g of unfermented Cocoa Lavado nibs finely ground and mixing them in a Hobart mixer at 65° C. with 10 g inoculum of salmonella-rich milk chocolate to achieve a salmonella-spiked cocoa mass. To this mixture is added a solution containing: 1.83 g citric acid, 8.43 g water, and 26.4 g ethanol (95%). The concentration of citric acid in the total mixture is about 1.2% and the ethanol concentration is about 17%. This mixture is allowed to mix for 15-30 minutes at 65° C. as is similar to the invention as described in FIG. 2 and Example 2. The resulting acidified salmonella-spiked cocoa mass exhibits at least a four-log reduction in microbe activity and is free of salmonella as shown in Table 3. This demonstrates that the acidification conditions described by the inventive process can act as a microbe inactivation step to produce a cocoa material that is free of salmonella or other deleterious food-borne microbes.

TABLE 3

Acid Induced Inactivation of a Salmonella-Spiked Cocoa Mass.

| Trial # | Salmonella in Inoculum | Estimated Salmonella in Spiked Liquor at zero time | Treatment Time at 65° C. | Presence/Absence of Salmonella after Treatment |
|---|---|---|---|---|
| 1 | $9.2 \times 10^6$ cells/g | $1 \times 10^4$ cells/g | 30 min | Negative |
| 2 | $9.2 \times 10^6$ cells/g | $1 \times 10^4$ cells/g | 15 min | Negative |
| 3 | $1.1 \times 10^6$ cells/g | $1 \times 10^4$ cells/g | 15 min | Negative |
| 4 | $1.1 \times 10^6$ cells/g | $1 \times 10^4$ cells/g | 15 min | Negative |

Incorporation of Acidified Red Cocoa Ingredients in Food Ingredients and Products

EXAMPLE 6

Red Cocoa Powder for Beverage Use

The red cocoa powder from the invention as described above can be used in whole or in part to create a powdered mix for use in water based beverages, imparting a unique red/burgundy color to the beverage. This beverage could be hot or cold and would have elevated cocoa flavanol and antioxidant content compared to regular cocoa mixes. In order to maintain the characteristic red color, the beverage is preferably kept at or below pH 5.

EXAMPLE 6a

Red Cocoa Powder for Use in Dairy Products

The red cocoa powder from the invention can be used in whole or in part to create a powder mix that can be used in a dairy application such as a yogurt or any other dairy based product that has an acidic pH imparting a unique red/burgundy color to the product. These dairy products would have elevated flavanol and resveratrol content compared to similar products prepared without the red cocoa powder from the invention. An example of such an application would be a plain or vanilla flavored yogurt with the addition of 2.5% by weight of the red cocoa powder from the invention to yield a red colored yogurt. The amount of red cocoa powder can be increased or decreased to achieve the desired color intensity and flavanol or resveratrol content. The red cocoa powder could also be used to enhance the color and/or flavanol or resveratrol content of a yogurt with a red fruit such as strawberry, cranberry, or cherry.

EXAMPLE 7

Red Dark Chocolate

Figure 5:
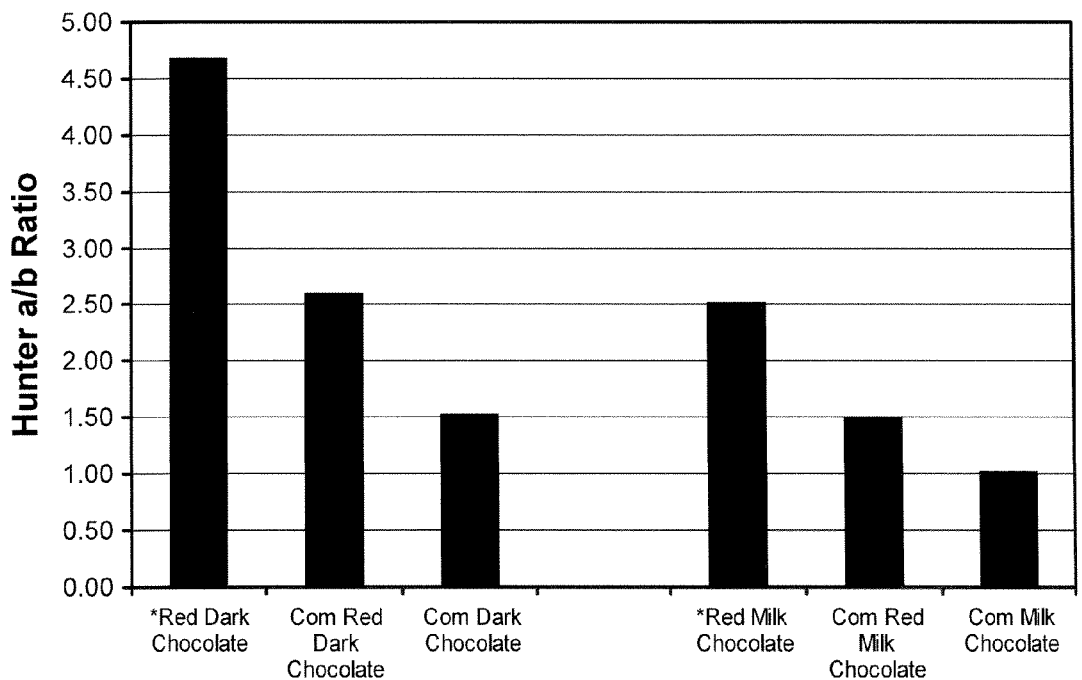
FIG. 5 is a chart similar to that in FIG. 4, showing the Hunter a/b ratios described in Table 4 for a series of dark (Example 7) and milk (Example 8) chocolates made with: red cocoa liquor of the invention (*Red Dark Chocolate and *Red Milk Chocolate), a commercial alkalized red cocoa powder, and a natural West Africa cocoa liquor. The degree of red color is expressed as the ratio of the Hunter a/b values. The higher the a/b ratio the more red color in the samples.

The red cocoa liquor or red powder from the invention can be used with added cocoa butter to formulate a dark chocolate product with a red/burgundy color. The flavor of the chocolate will vary depending on the use of unroasted or roasted red cocoa material, and other mixtures of cocoa products as described above. The resulting dark chocolate will have elevated flavanol and resveratrol content compared to regular dark chocolates with a similar amount of cocoa mass. A 100 g dark chocolate bar can be made according to traditional chocolate making methods using: 60 g of acidified red cocoa liquor from the invention, 37.68 g sugar, 2 g of cocoa butter, 0.3 g lecithin, and 0.02 g of vanillin. The color of the dark chocolate made with the red cocoa liquor of the invention (*Red Dark Choc) has a unique dark red color compared to dark chocolates made from conventional cocoa liquor or commercial red cocoa powder as shown by the color measurements in Table 4 and FIG. 5. According to the Hunter a/b ratios, that increase with more red color, the dark chocolate made with the red cocoa liquor of the invention had a three times higher a/b ratio than a conventional dark chocolate (Com Dark Choc) and almost a two times higher a/b ratio than a dark chocolate made with a commercial red cocoa powder (Com Red Dark Choc). Visual descriptions of each of these dark chocolates were made using the official Pantone Color Guide and the Munsell Color system shown in Table 4.

TABLE 4

Color Measurements of Dark and Milk Chocolates.

| | Hunter Color | | | | Visual | |
|---|---|---|---|---|---|---|
| Sample | "L" | "a" | "b" | a/b ratio* | Pantone # | Munsell # |
| *Red Dark Chocolate | 17.79 | 8.91 | 1.91 | 4.66 | 504 C | 2.5R-2/2 |

TABLE 4-continued

Color Measurements of Dark and Milk Chocolates.

| Sample | Hunter Color | | | a/b ratio* | Visual | |
|---|---|---|---|---|---|---|
| | "L" | "a" | "b" | | Pantone # | Munsell # |
| Com Red Dark Chocolate | 16.89 | 2.02 | 0.78 | 2.59 | Black 5C | 10R-2/1 |
| Com Dark Chocolate | 18.05 | 3.96 | 2.61 | 1.52 | 412 C | 10YR-2/1 |
| *Red Milk Chocolate | 29.38 | 12.59 | 5.02 | 2.51 | 490 U | 7.5R-4/2 |
| Com Red Milk Chocolate | 23.71 | 6.64 | 4.45 | 1.49 | 497C | 10R-3/2 |
| Com Milk Chocolate | 28.07 | 7.22 | 7.08 | 1.02 | 469 C | 10YR-4/2 |

EXAMPLE 8

Red Milk Chocolate

The red cocoa liquor or red cocoa powder from the invention with added cocoa butter can be used to formulate a milk chocolate with a red/burgundy color. The flavor of the chocolate will vary depending on the use of unroasted or roasted red cocoa material, and other cocoa products as described above, and the amount of milk or milk solids used. The resulting milk chocolate will have elevated cocoa flavanol and antioxidant content compared to regular milk or dark chocolates with similar levels of cocoa mass or solids. A typical example of a formulation for 10 g of milk chocolate incorporating red cocoa liquor could be as: Cocoa butter 16.3 g, red liquor 16.2 g, whole milk powder 26 g, granular sugar 41.08 g, vanillin 0.02 g, and lecithin 0.4 g. A conventional chocolate process can then be followed, which yields a milk chocolate with red color (*Red Milk Choc) and unique flavor compared to milk chocolates made from conventional chocolate liquor (Comm Milk Choc) or commercial red cocoa powder (Comm Red Milk Choc) as shown by the color measurements in Table 4 and FIG. 5. According to the Hunter a/b ratios, that increase with more red color, the milk chocolate made with the invention (*Red Milk Choc) had a 2.5 times higher a/b ratio than a conventional milk chocolate and more than a 1.5 times higher a/b ratio than a milk chocolate made with a commercial red cocoa powder. Visual descriptions of each of these milk chocolates were made using the official Pantone Color Guide and the Munsell Color system shown in Table 4.

Generally, unfermented Cacao Lavado beans or other unfermented or under-fermented beans, such as with a fermentation index of 0.7 or below, while described many years ago, are not used to a large extent in producing cocoa products. Typically, cacao bean-producing regions limit the content of unfermented beans to 10% or less due to its deleterious effects on taste and astringency. Furthermore, International Standards limit the level of slaty and purple unfermented beans to 10% or less (BCCCA, Cocoa Beans: Chocolate Manufacturers Quality Regulations, 1996). Accordingly, products made from raw or unfermented cacao bean samples or with at least 50% unfermented beans are unusual and are generally considered to be low quality. According to the invention, the use of exclusively raw or unfermented cocoa nib as a direct source, or at least much higher levels of Cacao Lavado beans or similar beans, can be acidified to yield distinctive red cocoa products, with a distinctive and acceptable taste and mouthfeel, and with enhanced levels of beneficial cocoa compounds such as flavanols and other antioxidants.

The examples presented above and the contents of the application define and describe examples of the many cocoa compositions, products, and methods that can be produced or used according to the invention. None of the examples and no part of the description should be taken as a limitation on the scope of the invention as a whole or of the meaning of the following claims.

What is claimed is:

1. A method of producing a cocoa product for use in preparing a food product or ingredient, comprising providing an under-fermented or substantially unfermented cocoa bean composition, collecting the nibs from the cocoa beans, treating the nibs with an acid composition comprising an acid and alcohol, under conditions that maintain or increase the relative epicatechin content by weight, followed by washing and drying the nibs, and processing the nibs into a cocoa product for use in a food product or ingredient, whereby the cocoa product is capable of being used at about 1% or more by weight in a food product, and where the food product exhibits an acceptable taste profile with respect to astringency or bitterness.

2. The method of claim 1, wherein the acid composition is at about pH 4 or below and comprises one or more of the following:
   phosphoric acid; citric acid; acid compositions derived from fruit juices or extracts or concentrates; lactic acid; adipic acid; acetic acid; ascorbic acid; malic acid, tartaric acid; hydrochloric acid; fumaric acid; sodium acid phosphate; sodium acid sulfate; gluconic acid; and glucono-delta-lactone.

3. The method of claim 2, wherein the food product is one of: a milk chocolate; a dark chocolate; a semi-sweet chocolate; a chocolate icing; a red chocolate; or a beverage.

4. The method of claim 1, wherein the acid composition is at between about pH 1 and about pH 3.

5. The method of claim 1, wherein the processing of the cocoa product comprises making red cocoa nibs, red cocoa liquor, or a red cocoa powder.

6. The method of claim 1, wherein the acid composition is about 0.5 N or above titratable acid equivalent to phosphoric acid in at least one acid.

7. The method of claim 1, further comprising roasting the acidified cocoa nibs.

8. The method of claim 7, wherein the roasting is at low temperature and short time to preserve the red color and develop roasted chocolate flavor notes.

9. The method of claim 1, further comprising adding an edible or food grade base or buffer.

10. The method of claim 9, wherein the food grade base or buffer comprises one or more of: calcium carbonate, potassium carbonate, or sodium hydroxide.

11. A method of producing a cocoa product for use in preparing a food product or ingredient, comprising providing a unfermented or under-fermented cocoa bean composition, collecting the nibs from the cocoa beans, grinding the nibs to paste or liquor, treating the paste or liquor with an acid composition comprising an acid and alcohol, under conditions that maintain or increase the relative epicatechin content by weight, followed by drying, and processing the liquor into a cocoa powder, whereby the cocoa powder is capable of being used at about 1% or more by weight in a food product, and wherein the food product exhibits an acceptable taste profile with respect to astringency or bitterness.

12. The method of claim 11, wherein the acid composition is about pH 4 or below and comprises one or more of the following:
  phosphoric acid; citric acid; acid compositions derived from fruit juices or extracts or concentrates; lactic acid; adipic acid; acetic acid; ascorbic acid; malic acid; tartaric acid; hydrochloric acid; fumaric acid; sodium acid phosphate; gluconic acid; and glucono delta-lactone.

13. The method of claim 11 or 12, wherein the acid composition is about 0.12 N or above titratable acid equivalent to phosphoric acid in at least one acid.

14. The method of claim 12, wherein the food product is one of: a milk chocolate; a dark chocolate; a semi-sweet chocolate; or a beverage.

15. The method of claim 11, further comprising roasting the acidified cocoa liquor.

16. The method of claim 15, wherein the roasting is at low temperature and short time to preserve the red color and develop roasted chocolate flavor notes.

17. The method of claim 11, further comprising adding an edible or food grade base or buffer.

18. The method of claim 17, wherein the food grade base or buffer comprises one or more of: calcium carbonate, potassium carbonate, or sodium hydroxide.

19. A method of producing a red cocoa powder comprising providing an unfermented or under-fermented cocoa composition, treating the composition with an acid composition comprising an acid and alcohol, under conditions that maintain or increase the relative epicatechin content by weight, and removing the acid composition and drying.

20. The method of claim 19, wherein the acid composition is at about pH 4 or below and comprises one or more of the following:
  phosphoric acid; citric acid; acid compositions derived from fruit juices or extracts or concentrates; lactic acid; adipic acid; acetic acid; ascorbic acid; malic acid; tartaric acid; fumaric acid; hydrochloric acid; fumaric acid; sodium acid phosphate; gluconic acid; and glucono delta-lactone.

21. The method of claim 20, wherein the food product is one of: a milk chocolate; a dark chocolate; a semi-sweet chocolate; a chocolate icing; a red chocolate; or a beverage.

22. The method of claim 19, wherein the acid composition is at between about pH 1 and about pH 3.

23. The method of claim 19, wherein the processing of the cocoa product comprises making red cocoa nibs, red cocoa liquor, or a red cocoa powder.

24. The method of claim 23, further comprising roasting the red acidified cocoa nibs.

25. The method of claim 24, wherein the roasting is at low temperature and short time to preserve the red color and develop roasted chocolate flavor notes.

26. The method of claim 19, wherein the acid composition is about 0.5 N or above titratable acid equivalent to phosphoric acid in at least one acid.

27. The method of claim 19, further comprising adding an edible or food grade base or buffer.

28. The method of claim 27, wherein the food grade base or buffer comprises one or more of: calcium carbonate, potassium carbonate, or sodium hydroxide.

29. The method of claim 1, 11 or 19, wherein drying comprises one or more of: low temperature heating; vacuum drying; or evaporative drying.

30. A method of maintaining the level of one or more cocoa antioxidants and/or resveratrols in a cocoa composition, comprising preparing a cacao bean sample from unfermented or under-fermented and unroasted cacao beans, processing the sample into a cocoa composition having cocoa solids, treating the cocoa solids with an acid composition comprising an acid and alcohol, and at a pH of about pH 4 or below while under conditions that maintain or increase the relative epicatechin content by weight, and removing the excess amount of acid composition and drying.

31. The method of claim 30, wherein the acid composition comprises one or more of the following: phosphoric acid; citric acid; acid compositions derived from fruit juices or extracts or concentrates; lactic acid; adipic acid; acetic acid; ascorbic acid; malic acid, tartaric acid; hydrochloric acid; fumaric acid, sodium acid phosphate; sodium acid sulfate, gluconic acid; and glucono-delta-lactone.

32. The method according to claim 30, wherein the level of epicatechin present is maintained and measured.

33. The method of claim 30, wherein epicatechin levels are increased 10% or more compared to an acid free treatment.

34. The method of claim 30, wherein epicatechin levels are increased 20% or more compared to an acid free treatment.

* * * * *